United States Patent
Omura (10) Patent No.: US 10,273,896 B2
(45) Date of Patent: Apr. 30, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Tetsuo Omura, Ashigarakami-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/837,006

(22) Filed: Dec. 11, 2017

(65) Prior Publication Data
US 2018/0216556 A1 Aug. 2, 2018

(30) Foreign Application Priority Data
Jan. 27, 2017 (JP) .................. 2017-013569

(51) Int. Cl.
| | | |
|---|---|---|
| F02D 13/04 | (2006.01) | |
| F02D 41/06 | (2006.01) | |
| F02D 41/00 | (2006.01) | |
| F02D 41/14 | (2006.01) | |
| F02D 35/02 | (2006.01) | |
| F02D 13/02 | (2006.01) | |
| F01L 1/00 | (2006.01) | |
| F02D 41/04 | (2006.01) | |

(52) U.S. Cl.
CPC ....... *F02D 41/068* (2013.01); *F02D 13/0234* (2013.01); *F02D 13/0269* (2013.01); *F02D 35/027* (2013.01); *F02D 41/0002* (2013.01); *F02D 41/1498* (2013.01); *F02D 41/047* (2013.01); *F02D 2041/001* (2013.01); *F02D 2200/021* (2013.01); *F02D 2200/0414* (2013.01); *Y02T 10/42* (2013.01)

(58) Field of Classification Search
CPC ............. F02D 13/0207; F02D 13/0242; F02D 13/0246; F02D 2041/001
USPC ... 123/319, 321, 322, 345–349, 90.1, 90.15, 123/90.17
See application file for complete search history.

(56) References Cited

U.S. PATENT DOCUMENTS

| | | | |
|---|---|---|---|
| 4,305,352 A * | 12/1981 | Oshima | ................... F01L 1/352 123/146.5 A |
| 2009/0259387 A1* | 10/2009 | Kakuya | ............... F02D 13/0265 701/103 |
| 2011/0259290 A1* | 10/2011 | Michikawauchi | ..... F02M 25/14 123/1 A |

FOREIGN PATENT DOCUMENTS

JP 2013-047487 A 3/2013

\* cited by examiner

*Primary Examiner* — John Kwon
(74) *Attorney, Agent, or Firm* — Sughrue Mion, PLLC (57) ABSTRACT

A control device for an internal combustion engine is provided to control the internal combustion engine that includes a variable valve operating device that makes variable an opening period of an intake valve that opens and closes an intake port. The control device is configured, in an engine operating condition in which knocking is easy to occur, to increase an effective opening period of the intake valve when an intake gas temperature in the intake port is higher than a wall temperature of the intake port as compared to when the intake gas temperature is lower than the wall temperature.

4 Claims, 7 Drawing Sheets

CONTROL DEVICE FOR INTERNAL COMBUSTION ENGINE

CROSS-REFERENCE TO RELATED APPLICATION

This application is based on and claims the benefit of Japanese Patent Application No. 2017-013569, filed on Jan. 27, 2017, which is incorporated by reference herein in its entirety.

BACKGROUND

Technical Field

The present disclosure relates to a control device for an internal combustion. engine, and more particularly to a control device for an internal combustion engine that includes a variable valve operating device that makes variable an opening period of an intake valve.

Background Art

For example, JP 2013-047487 A discloses an internal combustion engine that includes a variable valve timing device that makes variable a closing timing of an intake valve. In this internal combustion engine, late closing control that sets the closing timing of the intake valve on the retard side of an intake bottom dead center is performed. According to the late closing control, an actual compression ratio becomes lower than that in an example in which the intake valve closes at the intake bottom dead center, and knocking can thus be suppressed.

JP 2013-047487A is a patent document which may be related to the present disclosure.

SUMMARY

In order to suppress knocking, it is effective to decrease a compression end gas temperature by decreasing an intake gas temperature that contributes considerably to knocking. Also, to achieve this, it is required to facilitate the release of heat from the intake gas in an intake port to a wall surface of the intake port or reduce the heat received by the intake gas from the wall surface of the intake port. In this regard, the length of an opening period of an intake valve that is appropriate in decreasing the compression end gas temperature is different depending on which of the intake gas temperature in the intake part and a wall temperature of the intake port is higher. However, a technique disclosed in JP 2013-047487A does not focus on which of the intake gas temperature and the wall temperature is higher. This technique therefore still has room for improvement in terms of controlling the opening period of the intake valve to suppress knocking.

The present disclosure has been made to address the problem described above, and an object of the present disclosure is to provide a control device for an internal combustion engine that can more properly achieve the effects of suppressing knocking by the use of control of the opening period of an intake valve by taking into consideration which of an intake gas temperature in an intake port and a wall temperature of the intake port is higher.

A control device for controlling an internal combustion engine according to the present disclosure is configured to control an internal combustion engine including a variable valve operating device that makes variable an opening period of an intake valve that opens and closes an intake port.

Where an opening period that is included in an actual opening period identified by an opening timing and a closing timing of the intake valve and which is located in a crank angle period from an intake top dead center to the closing timing is referred to as an effective opening period, the control device is configured, in an engine operating condition in which knocking is easy to occur, to increase the effective opening period when an intake gas temperature in the intake port is higher than a wall temperature of the intake port as compared to when the intake gas temperature is lower than the wall temperature.

In changing the effective opening period in the engine operating condition in which knocking is easy to occur, the control device may be configured to change the closing timing without changing the opening timing.

The internal combustion engine may include a water temperature sensor configured to detect an engine cooling water temperature of an engine cooling water that cools an engine main body. The control device may also be configured to estimate the wall temperature based on the engine cooling water temperature detected by the water temperature sensor.

The control device may be configured, in a course of an engine warm-up in which the engine cooling water temperature is lower than a certain value, to estimate the wall temperature based on the engine cooling water temperature in consideration of a response delay of the wall temperature with respect to an increase of the engine cooling water temperature.

According to the control device for an internal combustion engine of the present disclosure, in an engine operating condition in which knocking is easy to occur, control is performed to increase the effective opening period when the intake gas temperature in the intake port is higher than the wall temperature of the intake port as compared to when the intake gas temperature is lower than the wall temperature. If the intake gas temperature is higher than the wall temperature, a longer effective opening period is better because the release of heat from the intake gas to the wall surface of the intake port is facilitated. On the other hand, if the intake gas temperature is lower than the wall temperature, a shorter effective opening period is better because the heat received by the intake gas from the wall surface is reduced. Thus, according to the control device of the present disclosure, regardless of which of the intake gas temperature and the wall temperature is higher in the engine operating condition in which knocking is easy to occur, the effective opening period can be controlled so as to be an appropriate opening period in terms of a decrease of the compression end gas temperature (that is, suppression of knocking). The effects of suppressing knocking by the use of the control of opening period of the intake valve can therefore be achieved properly.

DETAILED DESCRIPTION

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

First, a first embodiment according to the present disclosure will be described with reference to FIGS. 1 to 7.

Figure 1:
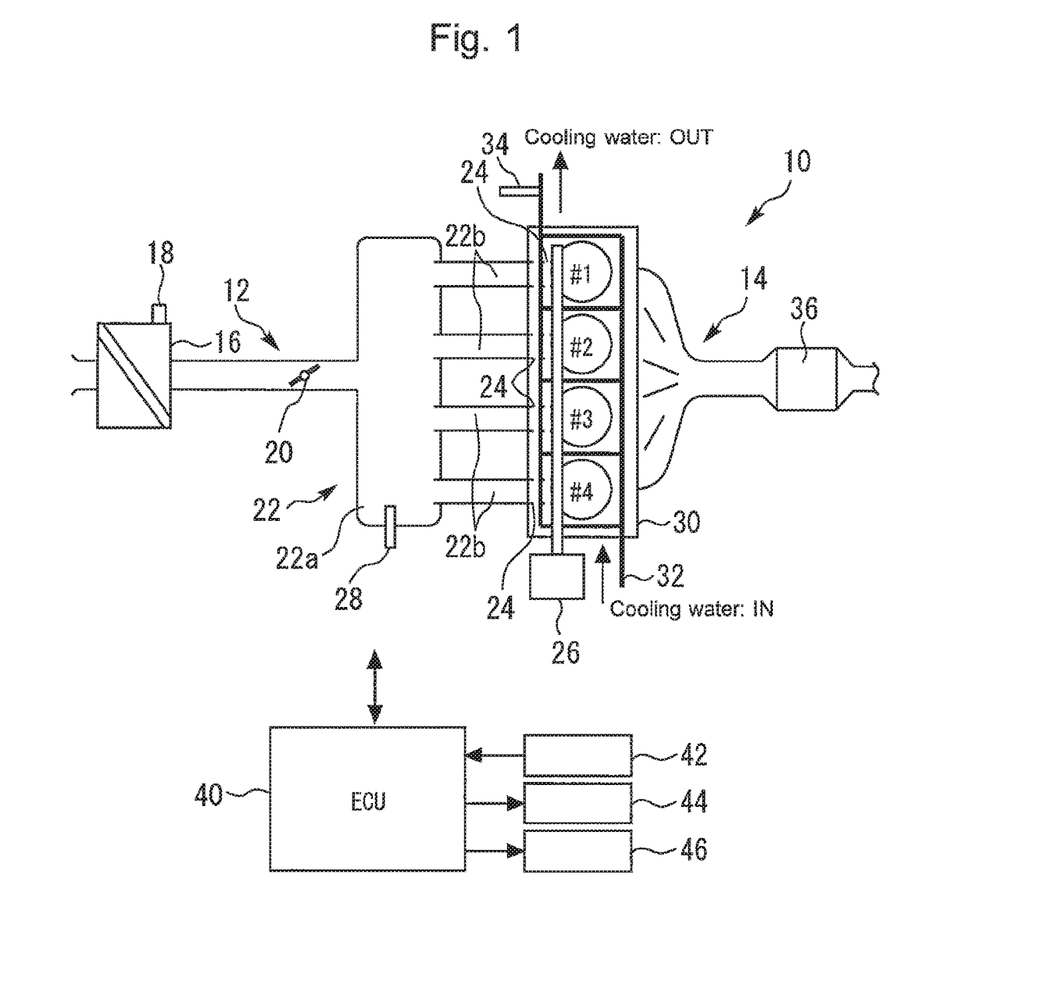
FIG. 1 is a diagram for describing a system configuration according to a first embodiment of the present disclosure.

1. System Configuration According to First Embodiment 1-1. Overall System Configuration FIG. 1 is a diagram for describing a system configuration according to the first embodiment of the present disclosure. The system shown in FIG. 1 includes a spark-ignition type internal combustion engine 10. The internal combustion engine 10 is a naturally aspirated engine, and, as an example, an in-line four cylinder engine. An intake channel 12 and an exhaust channel 14 communicate with each cylinder of the internal combustion engine 10.

An air cleaner 16 is provided in the vicinity of an inlet of the intake channel 12. An air flow sensor 18 that outputs a signal responsive to the flow rate of intake gas (air) that flows through the intake channel 12 is attached to the air cleaner 16. An electronically controlled throttle valve 20 is arranged downstream of the air flow sensor 18.

An intake manifold 22 is provided on the downstream side of the throttle valve 20. A channel in the intake manifold 22 serves as a part of the intake channel 12. The intake manifold 22 includes a surge tank (i.e., a collective portion) 22a and branch portions 22b provided for each cylinder. In the example of the internal combustion engine 10, there are four branch portions 22b. Each of the branch portions 22b connects the surge tank 22a and an intake port 24 of the respective cylinders formed in a cylinder head. Thus, the intake gas that has passed through the air cleaner 16 flows into each of the branch portions 22b in the intake manifold 22 to branch toward each cylinder. The intake gas that has flown into each of the branch portions 22b is suctioned into the cylinders via the respective intake ports 24.

The intake port 24 of each cylinder opens and closes by an intake valve (not shown in the drawing). The internal combustion engine 10 is equipped with a variable valve operating device 26 that is driven to open and close the intake valve of each cylinder. The variable valve operating device 26 has a function that makes variable an opening period of the intake valve (in more detail, which is a crank angle width in which the intake valve opens and is also called as an operating angle). This kind of function can be achieved by configuring the variable valve operating device 26, for example, so as to have a plurality of cams (in the present embodiment, two cams as an example) whose profiles are different in the opening period of the intake valve and a known mechanism that switches the cam that drives the intake valve from the plurality of cams. An example of two lift curves of the intake valve that is selected by the variable valve operating device 26 is described later with reference to FIG. 2.

An intake gas temperature sensor 28 is attached to the surge tank 22a. The intake gas temperature sensor 28 outputs a signal responsive to the intake gas temperature in the intake channel 12.

A cooling system of the internal combustion engine 10 includes a cooling water flow channel through which an engine cooling water that cools an engine main body (i.e., cylinder block and cylinder head) 30 flows. In FIG. 1, only a cooling water flow channel 32 located inside the engine main body 30 and in the vicinity thereof is represented. In the cooling water flow channel 32, a water temperature sensor 34 that outputs a signal responsive to an engine cooling water temperature Twt is installed.

In the exhaust channel 14, an exhaust gas purifying catalyst (as an example, a three-way catalyst) 36 for purifying exhaust gas is installed. The system according to the present embodiment further includes an electric control unit (ECU) 40. Various sensors and various actuators are electrically connected to the ECU 40.

The various sensors described above include a crank angle sensor 42 that outputs a signal responsive to a crank angle, as well as the air flow sensor 18, the intake gas temperature sensor 28 and the water temperature sensor 34 that are described above. The ECU 40 can obtain an engine speed by the use of the crank angle sensor 42. Moreover, the various actuators described above include fuel injection valves 44 and an ignition device 46 as well as the throttle valve 20 and the variable valve operating device 26 described above. The fuel injection valves 44 are provided for the respective cylinders, and each of them injects fuel the cylinder them directly. The fuel injection valves 44 may be port injection valves that inject fuel into the respective intake ports 24 instead of this kind of in-cylinder injection valves or in addition thereto. The ignition device 46 uses a spark plug provided for each cylinder to ignite an air-fuel mixture in each cylinder.

The ECU 40 includes a processor, a memory, and an input/output interface. The input/output interface receives sensor signals from the various sensors described above, and outputs actuating signals to the various sensors described above. In the memory, various control programs and maps for controlling the various actuators are installed. The processor reads out a control program from the memory and executes the control program. Thus, a function of the "control device for an internal combustion engine" according to the present embodiment is achieved.

1-2. Valve Opening Characteristics of Intake Valve

Figure 2:
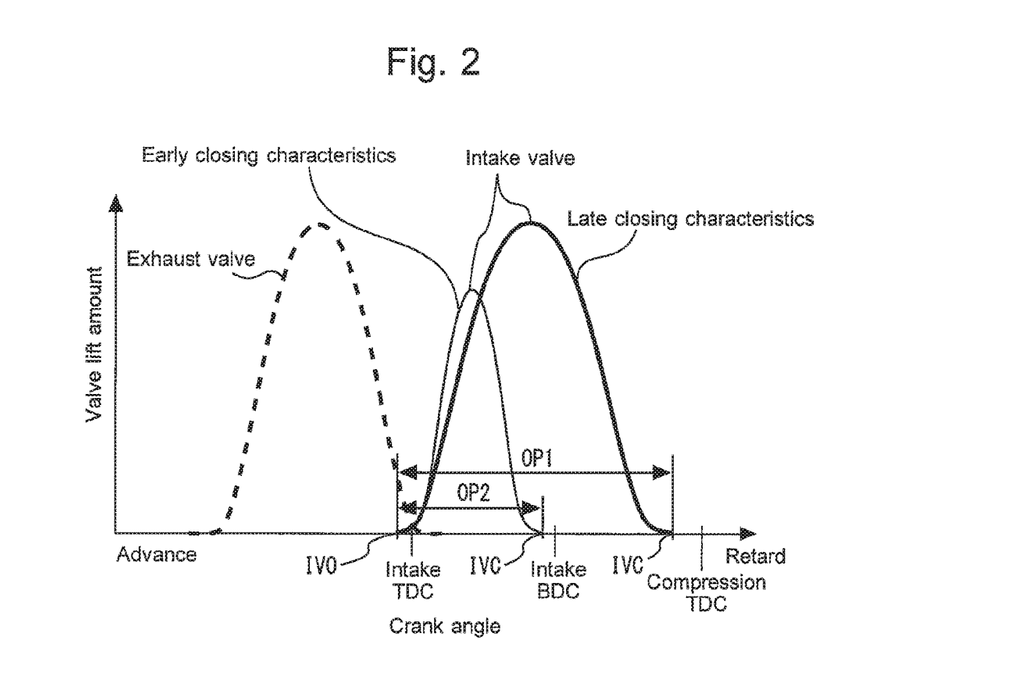
FIG. 2 shows valve lift curves for describing the valve opening characteristics of an intake valve controlled by a variable valve operating device shown in FIG. 1.

FIG. 2 shows valve lift curves for describing the valve opening characteristics of the intake valve controlled by the variable valve operating device 26 shown in FIG. 1.

According to the variable valve operating device 26, as already described, two valve lift curves (i.e., two valve profiles) can be selected. As shown in FIG. 2, one of these two valve lift curves has a characteristics in which the intake valve closes at a timing (more specifically, a crank angle timing) on the retard side of an intake bottom dead center (BDC) (hereafter, referred to as a "late closing characteristics"). On the other hand, the other valve lift curve has a characteristics in which the intake valve closes at a timing (a crank angle timing) on the advance side of the intake bottom dead center (hereafter, referred to as an "early closing characteristics").

Furthermore, in the example shown in FIG. 2, the opening timings of the intake valve in the late closing characteristics and the early closing characteristics are equal to each other in the vicinity of the intake top dead center (TDC). Thus, an actual opening period OP1 in the late closing characteristics is longer than an actual opening period OP2 in the early closing characteristics. In addition, in the example shown in FIG. 2, an exhaust valve is configured to close in the vicinity of the intake top dead center.

2. Opening Period Control of Intake Valve According to First Embodiment

Control performed by the ECU 40 includes opening period control of the intake valve. As described below, the opening period control according to the present embodiment is changed in accordance with whether an engine operating condition is a condition in which knocking is easy to occur or a condition in which knocking is hard to occur.

2-1. Knocking Region and Non-Knocking Region

Figure 3:
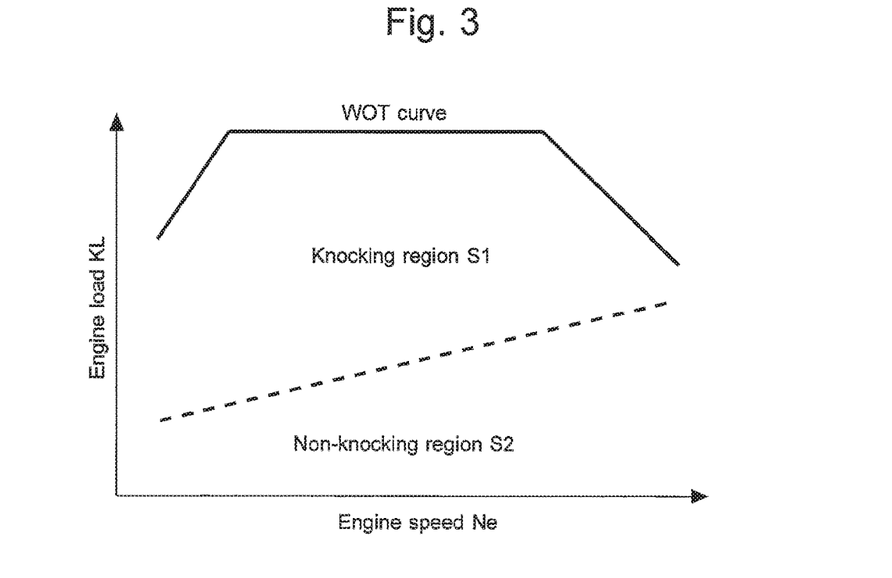
FIG. 3 is a graph that schematically represents a knocking region and a non-knocking region.

FIG. 3 is a graph that schematically represents a knocking region and a non-knocking region. Where an engine operating region is represented with an engine load KL and the engine speed Ne as shown in FIG. 3, an engine operating region on the high load side corresponds to a "knocking region S1" in which knocking is easy to occur. To be more specific, the knocking region S1 extends to the lower-load side when the engine speed Ne is lower. An operating region located on the lower-load side as compared to the knocking region S1 corresponds to a "non-knocking region S2". The non-knocking region S2 is an operating region in which knocking is harder to occur as compared to the knocking region S1. In addition, a WOT curve in FIG. 3 indicates a full load torque curve.

2-2. Opening Period Control of Intake Valve in Knocking Region S1

In the present embodiment, in order to suppress knocking in the knocking region S1, the opening period control of the intake valve is performed, as described below, on the basis of the intake gas temperature Tig in the intake port 24 and the wall temperature Tpwl of the intake port 24.

2-2-1. Effects of Intake Gas Temperature Tig and Wall Temperature Tpwl of Intake Port with Respect to Change of Compression End Gas Temperature Accompanying Change of Opening Period OP of Intake Valve In order to improve knocking, it is effective to decrease the compression end gas temperature. It is effective for a decrease of the compression end gas temperature that the closing timing of the intake valve is retarded or advanced with respect to the intake bottom dead center to decrease an actual compression ratio an effective compression ratio) as compared to a mechanical compression ratio (which is a value mechanically defined by the stroke volume of a piston and a combustion chamber volume). According to the late closing characteristics and the early closing characteristics shown in FIG. 2, a decrease of the actual compression ratio can be achieved since a closing timing IVC is away from the intake bottom dead center in both examples.

Furthermore, in order to improve knocking, it is important to decrease the compression end gas temperature by decreasing the intake gas temperature Tig that contributes considerably to knocking, as well as decreasing the actual compression ratio. As a result of earnest study, the inventor has found that, in order to decrease the compression end gas temperature, it is effective to perform control to change a time of transfer of heat between the intake gas in the intake port 24 and the wall surface of the intake port 24 in accordance with which of the intake gas temperature Tig and the wall temperature Tpwl of the intake port 24 is higher.

In detail, in order to decrease the compression end gas temperature by decreasing the intake gas temperature Tig, it is required to facilitate the release of heat from the intake gas in the intake port 24 to the wall surface of the intake port 24 or reduce the heat received by the intake gas from the wall surface. In this regard, the thermal conductivity between the intake gas and the wall surface in the intake port 24 depends on the flow velocity of the intake gas. Thus, the heat transfer between the intake gas and the wall surface basically occurs in a time period in which the flow of the intake gas occurs in the intake port 24. Although this time period basically corresponds to the opening period OP of the intake valve, it is strictly identified by an "effective opening period OPe" of the intake valve described later with reference to FIGS. 4A to 4C.

As described above, the heat transfer between the intake gas and the wall surface basically occurs in the effective opening period OPe. That is, when the effective opening period OPe is longer, the time of transfer of heat (that is, a heat transfer time period) between the intake gas and the wall surface becomes longer. Therefore, in an example in which the intake gas temperature Tig is higher than the wall temperature Tpwl (that is, in an example in which a heat transfer from the intake gas to the wall surface occurs), a time period in which the release of heat from the wall surface to the intake gas is performed becomes longer when the effective opening period OPe is longer, and the release of heat can thus be facilitated. As a result, since the temperature of the intake gas that flows into the cylinders decreases, the compression end gas temperature also decreases. On the other hand, in an example in which the intake gas temperature Tig is lower than the wall temperature Tpwl (that is, in an example in which the transfer of heat from the wall surface to the intake gas occurs), a time period in which the intake gas receives heat from the wall surface becomes shorter when the effective opening period OPe is shorter, and the heat-receiving can thus be reduced. As a result, since an increase of the temperature of the intake gas that flows into the cylinders decreases, an increase of the compression end gas temperature can also be reduced.

2-2-2. Effective Opening Period OPe

Figure 4A:
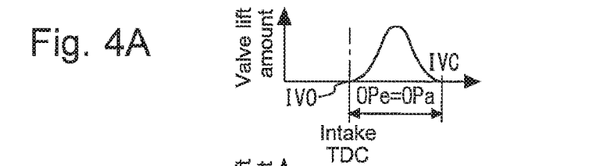
FIGS. 4A to 4C are graphs for describing an effective opening period OPe.
Figure 4B:
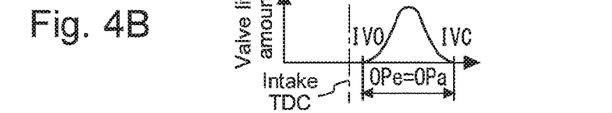
Figure 4C:
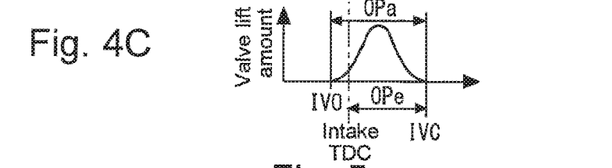

FIGS. 4A to 4C are graphs for describing the effective opening period OPe. FIG. 4A represents an example in which an opening timing IVO of the intake valve is the same as the intake top dead center; FIG. 4B represents an example in which the opening timing IVO is more retarded than the intake top dead center (i.e., an example of late opening); and FIG. 4C represents an example in which the opening timing IVO is more advanced than the intake top dead center (i.e., an example of early opening).

The effective opening period OPe refers to an opening period that is included in an actual opening period OPa identified by the opening timing IVO and the closing timing IVC of the intake valve and Which is located in a crank angle period from the intake top dead center to the closing timing IVC. Thus, in the examples shown by FIGS. 4A and 4B, the effective opening period OPe becomes equal to the actual opening period OPa. That is, according to these examples, the effective opening period OPe corresponds to the overall period of the actual opening period OPa.

On the other hand, in the example shown in FIG. 4C, the effective opening period OPe is different from (i.e., is shorter than) the actual opening period OPa. That is, in this example, the effective opening period OPe corresponds to a part of the actual opening period OPa. In a crank angle period located on the advance side of the intake top dead center (i.e., in a crank angle period during the exhaust stroke), the flow of the intake gas does not occur effectively even when the intake valve opens Thus, this crank angle period is excluded from the effective opening period OPe as exemplified in FIG. 4C.

In further addition to this, when the closing timing IVC of the intake valve is retarded to decrease the actual compression ratio as with the example of the late closing characteristics shown in FIG. 2, a part of the intake gas suctioned in the cylinders is blown back into the intake ports 24. In the intake ports 24, the transfer of heat between the intake gas and the wall surface occurs also during a blow-back period in which this kind of blow-back of the gas occurs. Also, a blow-back gas that is blown back into the intake ports 24 and is subject to the transfer of heat are suctioned into the cylinders at the next cycle as an intake gas. Thus, according to the late closing characteristics in which the blow-back period is included in the opening period OP, the blow-back period is also included in the effective opening period OPe.

2-2-3. Opening Period Control in High Intake Gas Temperature Condition (Tig>Tpwl)

Figure 5:
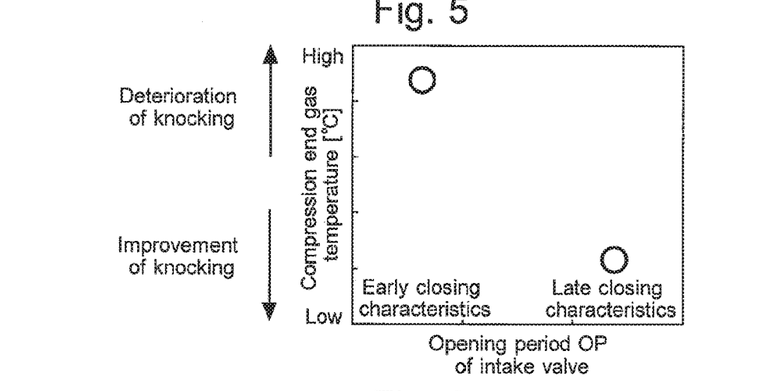
FIG. 5 is a graph that illustrates a relationship between a compression end gas temperature and an opening period OP of the intake valve in an example in which an intake gas temperature Tig is higher than a wall temperature Tpwl.

FIG. 5 is a graph that illustrates a relationship between the compression end gas temperature and the opening period OP of the intake valve in an example in Which the intake gas temperature Tig is higher than the wall temperature Tpwl. In addition, FIG. 5 represents a relationship at a condition in which the engine operating condition (mainly, the engine load KL and the engine speed Ne) is equal to each other. This also applies to FIG. 6 described later.

In the high intake gas temperature condition (Tig>Tpwl), that is, in a condition in which the release of heat from the intake gas to the wall surface is performed, the release of heat can be facilitated more effectively when the effective opening period OPe is longer, as described above, The effective opening period OPe becomes longer in the late closing characteristics than in the early closing characteristics. Thus, in the high intake gas temperature condition, as shown in FIG. 5, the compression end gas temperature decreases (that is, knocking can be improved) more effectively in the late closing characteristics as compared to in the early closing characteristics. It can therefore be said that, in order to suppress knocking in the knocking region S1, it is better to select the late closing characteristics in the high intake gas temperature condition. Accordingly, in the present embodiment, if the high intake gas temperature condition described above is met in the knocking region S1, the variable valve operating device 26 is controlled such that the late closing characteristics is selected.

2-2-4. Opening Period Control in Low Intake Gas Temperature Condition (Tig<Tpwl)

Figure 6:
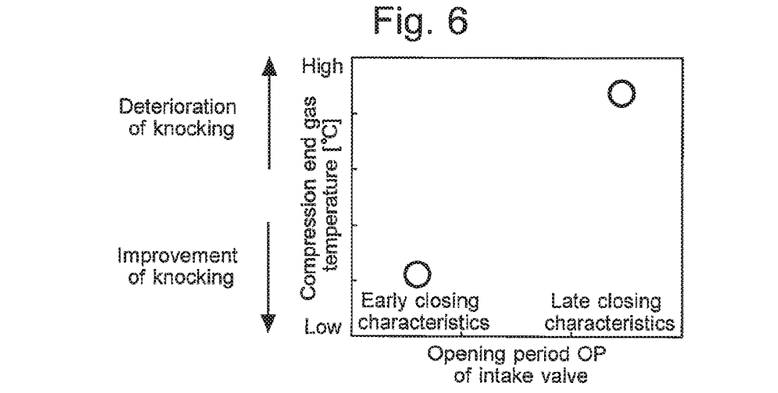
FIG. 6 is a graph that illustrates a relationship between the compression end gas temperature and the opening period OP of the intake valve in an example in which the intake gas temperature Tig is lower than the wall temperature Tpwl.

FIG. 6 is a graph that illustrates a relationship between the compression end gas temperature and the opening period OP of the intake valve in an example in which the intake gas temperature Tig is lower than the wall temperature Tpwl.

In the low intake gas temperature condition (Tig<Tpwl), that is, in a condition in which the intake gas receives heat from the wall surface, the heat-receiving can he suppressed more effectively when the effective opening period OPe is shorter, as described above. The effective opening period OPe becomes lower in the early closing characteristics than in the late closing characteristics. Thus, in the low intake gas temperature condition, as shown in FIG. 6, the compression end gas temperature decreases (that is, knocking can be improved) more effectively in the early closing characteristics as compared to in the late closing characteristics. It can therefore be said that, in order to suppress knocking in the knocking region S1, it is better to select the early closing characteristics in the low intake gas temperature condition. Accordingly, in the present embodiment, if the low intake gas temperature condition described above is met in the knocking region S1, the variable valve operating device 26 is controlled such that the early closing characteristics is selected.

2-3. Opening Period Control of Intake Valve in Non-Knocking Region S2

In the non-knocking region S2 in which there is less concerned about knocking, the variable valve operating device 26 is controlled such that an valve opening characteristics that is optimal in terms of fuel consumption of the internal combustion engine 10 is selected from the late closing characteristics and the early closing characteristics in the individual engine operating points.

Figure 7:
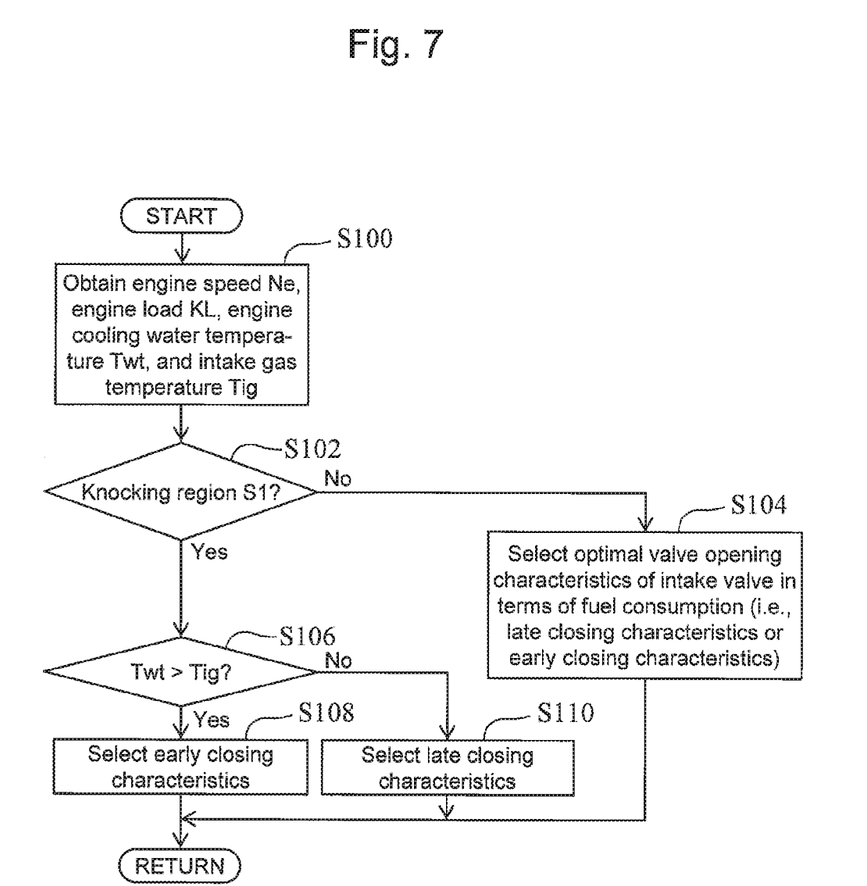
FIG. 7 is a flow chart that illustrates a routine of the processing concerning an opening period control of the intake valve according to the first embodiment of the present disclosure.

2-4. Processing of ECU concerning Opening Period Control of Intake Valve according to First Embodiment FIG. 7 is a flow chart that illustrates a routine of the processing concerning the opening period control of the intake valve according to the first embodiment of the present disclocure. In addition, the present routine is repeatedly executed at a predetermined control cycle during operation of the internal combustion engine 10.

According to the routine shown in FIG. 7, the ECU 40 first obtains the engine speed Ne, the engine load KL, the engine cooling water temperature Twt and the intake gas temperature Tig (step S100), In addition, the engine load (more specifically, a load factor (%)) KL can be calculated on the basis of the intake air flow rate based on the air flow sensor 18 and the engine speed Ne based on the crank angle sensor 42. The engine cooling water temperature Twt is detected by the use of the water temperature sensor 34.

Moreover, in step S100, the intake gas temperature Tig that is a temperature of the intake gas in the intake port 24 is obtained (estimated) by the use of a detection value of the intake gas temperature sensor 28 attached to the surge tank 22a, as an example. However, the location of the temperature sensor 28 for obtaining the intake gas temperature Tig is not especially limited, as far as it is located in the intake channel 12.

Next, the ECU 40 determines whether or not the current engine operating point identified by the engine load KL and the engine speed Ne that are obtained in step S100 is in the knocking region S1 (see FIG. 3) (step S102). To be more specific, in the ECU 40, a predetermined relationship as shown in FIG. 3 (a relationship between the engine load KL and engine speed NE, and the knocking region S1 and non-knocking region S2) is stored as a map. The determination of this step S102 is performed with reference to this kind of map.

It should be noted that the determination as to whether or not the current engine operating condition is an engine operating condition in which knocking is easy to occur may not be always performed on the basis of the engine operating region by the use of the map as described above. That is, the determination described above may be, for example, performed on the basis of information from a sensor, such as the water temperature sensor 34 or a knock sensor, during operation of the internal combustion engine 10, instead of the method described above or in addition thereto.

If the ECU 40 determines that the current engine operating point is not in the knocking region S1, that is, if it can be judged that, since the engine operating point is in the non-knocking region S2, the engine operating condition in which knocking is hard to occur is met, processing proceeds to step S104. In step S104, the variable valve operating device 26 is controlled such that a valve opening characteristics that is optimal in terms of fuel consumption of the internal combustion engine 10 is selected from the late closing characteristics and the early closing characteristics in the individual engine operating points. To be more specific, the ECU 40 stores a map (not shown in the drawing) which is associated with the valve opening characteristics (i.e., the late closing characteristics and the early closing characteristics) of the intake valve that are optimal in terms of the fuel consumption for the individual engine operating points in the non-knocking region S2. In this step S104, with reference to this kind of map, the valve opening characteristics of the intake valve that is optimal in fuel consumption in the current engine operating point is selected.

If, on the other hand, the ECU 40 determines in step 5102 that the current engine operating point is in the knocking region S1, that is, if it can be judged that the engine operating condition in which knocking is easy to occur is met, processing proceeds to step S106. In step S106, it is determined whether or not the engine cooling water temperature Twt is higher than the intake gas temperature Tig.

There is a correlation between the wall temperature Tpwl that is a wall surface temperature of the intake port 24 and the engine cooling water temperature Twt. Accordingly, in the determination of step S106, the engine cooling water temperature Twt is substituted, and the engine cooling water temperature Twt is treated (estimated) as being equivalent to the wall temperature Tpwl, In addition, although a dedicated sensor may be installed at the wall surface of the intake port 24 in order to obtain the wall temperature Tpwl, the installation of the sensor can be omitted by the use of the water temperature sensor 34. Therefore, an increase of cost can be prevented.

If the ECU 40 determines in step S106 that the engine cooling water temperature Twt is higher than the intake gas temperature Tig, that is, if the low intake gas temperature condition shown in FIG. 6 described above is met (Tig<Tpwl), the variable valve operating device 26 is controlled such that the early closing characteristics in which the effective opening period OPe is relatively shorter is selected (step S108).

On the other hand, the results of determining in step S106 that the engine cooling water temperature Twt is equal to or lower than the intake gas temperature Tig includes a result of the high intake gas temperature condition shown in FIG. 5 described above being met (Tig>Tpwl). In this example, the ECU 40 controls the variable valve operating device 26 such that the late closing characteristics in which the effective opening period OPe is relatively longer is selected (step S110).

It should be noted that, in the example of the routine shown in FIG. 7, the result of determining that the determination of step S106 is established includes a result of the engine cooling water temperature Twt being equal to the intake gas temperature Tig. In this regard, the opening period control of the intake valve for the knocking region S1 according to the present embodiment is not addressed to when the engine cooling water temperature Twt is equal to the intake gas temperature Tig. Thus, when the engine cooling water temperature Twt is equal to the intake gas temperature Tig, the valve opening characteristics of the intake valve may not be switched (i.e., the late closing characteristics or the early closing characteristics currently in use may be maintained) contrary to the example described above.

2-5. Advantageous Effects of Opening Period Control of Intake Valve According to First Embodiment According to the routine shown in FIG. 7 described so far, when the intake gas temperature Tig is higher than the wall temperature Tpwl (more specifically, a substitute engine cooling water temperature Twt) in the knocking region S1, the late closing characteristics in which the effective opening period OPe is relatively longer is selected. As a result, the release of heat from the intake gas to the wall surface of the intake ports 24 can be facilitated. When, on the other hand, the intake gas temperature Tig is lower than the wall temperature Tpwl (the engine cooling water temperature Twt) in the knocking region S1, the early closing characteristics in which the effective opening period OPe is relatively shorter is selected. As a result, the intake gas can be prevented from receiving heat from the wall surface. More specifically, according to the routine described above, when the intake gas temperature Tig is higher than the wall temperature Tpwl in the knocking region S1, the variable valve operating device 26 is controlled such that the effective opening period OPe becomes longer than that when the intake gas temperature Tig is lower than the wall temperature Tpwl. In this way, according to the present embodiment, which of the intake gas temperature Tig and the wall temperature Tpwl is higher is taken into consideration with respect to the opening period control of the intake valve in the knocking region S1. According to this kind of control, even when the current temperature condition in the knocking region S1 is either the high intake gas temperature condition or the low intake gas temperature condition, a valve opening characteristics (i.e., the late closing characteristics or the early closing characteristics) of the intake valve that is appropriate in terms of a decrease of the compression end gas temperature (that is, suppression of knocking) can be selected.

Furthermore, according to the present embodiment, if the late closing characteristics or the early closing characteristics is selected in accordance with the temperature condition describe above (that is, if the effective opening period OPe is changed on the basis of the results of comparison between the intake gas temperature Tig and the wall temperature Tpwl), the closing timing IVC is changed without changing the opening timing IVO as shown in FIG. 2. Changing the effective opening period OPe can also be performed by changing the opening timing IVO in a crank angle period at or after the intake top dead center, contrary to this kind of example. However, if a retard amount of the opening tuning IVO with respect to the intake top dead center increases, pumping loss increases. In contrast to this, taking the closing timing IVC away from the intake top dead center leads to a decrease of the pumping loss in both of the late closing characteristics and the early closing characteristics. Therefore, with the effective opening period OPe being changed as a result of a change of the closing timing IVC as in the present embodiment, the opening period control for improving knocking can be performed while reducing the pumping loss.

Second Embodiment

Figure 8:
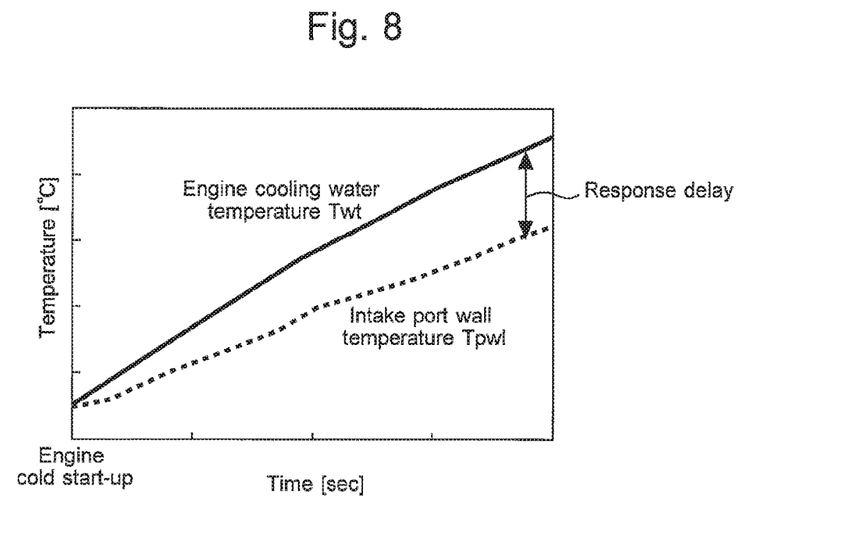
FIG. 8 is a time chart that illustrates changes of an engine cooling water temperature Twt and the wall temperature Tpwl in the course of an engine warm-up.

Next, a second embodiment of the present disclosure will be described with reference to FIGS. 8 to 10.

1. System Configuration according to Second Embodiment

In the following description, it is assumed that the configuration shown in FIG. 1 is used as an example of the system configuration according to the second embodiment.

2. Opening Period Control of Intake Valve According to Second Embodiment 2-1. Estimation Method of Wall Temperature Tpwl FIG. 8 is a time chart that illustrates changes of the engine cooling water temperature Twt and the wall temperature Tpwl in the course of an engine warm-up. In the course of an engine warm-up after a cold start-up, the engine cooling water temperature Twt increases with a lapse of time as shown in FIG. 8. The wall temperature Tpwl of the intake port 24 also increases with a lapse of time as with the engine cooling water temperature Twt.

In more detail, the cylinder head in which the intake ports 24 are formed has a large heat capacity. Thus, the wall temperature Tpwl of the intake port 24 increases with a response delay with respect to an increase of the engine cooling water temperature Twt as shown in FIG. 8. In further addition to this, this response delay is basically eliminated after the engine warm-up is completed. Moreover, although this response delay may occur also when the engine load KL changes after the engine warm-up is completed, the level of the response delay is efficiently lower than that in the course of the engine warm-up.

According to the first embodiment that substitutes the engine cooling water temperature Twt to obtain the wall temperature Tpwl, the wall temperature Tpwl can be easily obtained (estimated) by the use of the water temperature sensor 34 with which the internal combustion engine 10 is already equipped. However, in order to perform the opening period control of the intake valve for the knocking region S1 while more precisely evaluating which of the intake gas temperature Tig and the intake port 24 is higher even in the course of the engine warm-up, it is favorable that the aforementioned response delay concerning the wall temperature Tpwl is taken into consideration.

Accordingly, in the present embodiment, by the use of the estimation method described with reference to FIG. 9 described below, the wall temperature Tpwl is estimated from the engine cooling water temperature Twt while taking into consideration the response delay described above. In more detail, an estimated intake port wall temperature Tpwle that is an estimation value of the wall temperature Tpwl of the intake port 24 is calculated in consideration of the response delay described above.

Figure 9:
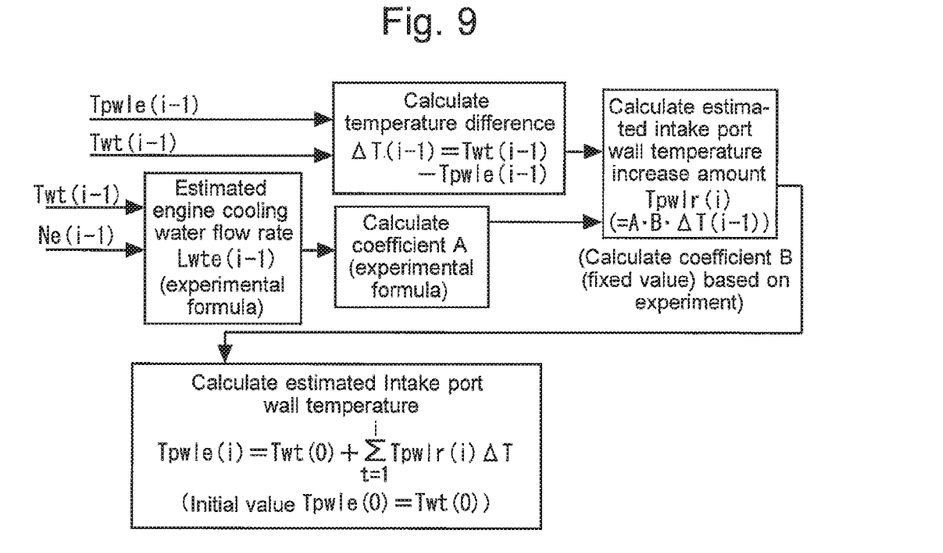
FIG. 9 is a block diagram for describing a procedure to calculate the current value Tpwle (i) of an estimated intake port wall temperature Tpwle with taking into consideration a response delay with respect to a change of the engine cooling water temperature Twt.

FIG. 9 is a block diagram for describing a procedure to calculate the current value Tpwle (i) of the estimated intake port wall temperature Tpwle with taking into consideration the response delay with respect to a change of the engine cooling water temperature Twt. In addition, in the following description, each value of variables attached with index i indicates the i-th value obtained at the i-th acquisition timing.

According to the procedure of calculation shown in FIG. 9, the ECU 40 calculates the previous value Lwte (i−1) of an estimated engine cooling water flow rate. In the ECU 40, an experimental formula (or a map may be used instead) that represents a predetermined relationship between the engine cooling water temperature Twt and engine speed Ne, and an estimated engine cooling water flow rate Lwte is stored. The ECU 40 assigns the previous value Twt (i−1) of the engine cooling water temperature and the previous value Ne (i−1) of the engine speed to this kind of experimental formula to calculate the previous value Lwte (i−1) of the estimated engine cooling water flow rate.

A coefficient A in FIG. 9 is a thermal conductivity between the engine cooling water and the wall surface of the intake port 24 and depends on the engine cooling water flow rate. Accordingly, in the ECU 40, an experimental formula (or a map may be used instead) that represents a predetermined relationship between the estimated engine cooling water flow rate Lwte and the coefficient A is stored, The ECU 40 assigns the previous value Lwte (i−1) of the estimated engine cooling water flow rate to this kind of experimental formula to calculate the coefficient A.

In parallel to the calculation of the coefficient A, the ECU 40 calculates a temperature difference between the previous value Twt (i−1) of the engine cooling water temperature and the previous value Tpwle (i−1) of the estimated intake port wall temperature as the previous value $\Delta T$ (i−1) of this temperature difference. As an initial value Tpwle (0) of the estimated intake port wall temperature, the engine cooling water temperature at a cold start-up time point (t-0), that is, an initial value Twt (0) is used. In addition, t is a time from the cold start-up time point.

Furthermore, as the current value Tpwlr (i) of an estimated intake port wall temperature increase amount, the ECU 40 calculates a product of a calculated coefficient A, a calculated previous value ΔT (i−1) of the temperature difference, and a coefficient B. The coefficient B is a value according to the heat capacity of the cylinder head, and is determined in advance as a value (a fixed value) that depends on a specification of the internal combustion engine 10 that is intended.

The produce of the coefficient A and the previous value ΔT (i−1) of the temperature difference corresponds to the amount of transfer of heat to the intake ports 24 from the engine cooling water in a time period (an acquisition cycle ΔT) from the previous acquisition tuning (i−1) to the current acquisition timing (i). Also, the current value Tpwlr (i) of the estimated intake port wall temperature increase amount obtained by multiplying this product by the coefficient B corresponds to an increase amount of the intake port wall temperature Tpwl according to the amount of transfer of the heat. In addition, the time period ΔT described above is, as an example, the same as a control cycle of a routine shown in FIG. 10 described later.

According to the procedure of calculation shown in FIG. 9, the ECU 40 finally calculates the current value Tpwle (i) of the estimated intake port wall temperature by adding i-time time-integral values concerning the current value Tpwlr (i) of the estimated intake port wall temperature increase amount to the initial value Twt (0) of the engine cooling water temperature that is equal to the initial value Tpwle (0) of the estimated intake port wall temperature.

2-2. Outline of Opening Period Control using Estimated Intake Port Wall Temperature Tpwle In the present embodiment, after a courser of the engine warm-up (hereafter, also referred to as a "cold mode") is ended, as in the first embodiment, the opening period control is performed by the use of the engine cooling water temperature Twt in the knocking region S1, instead of the wall temperature Tpwl. On the other hand, in the course of the engine warm-up (in the cold mode) in which a response delay of the intake port wall temperature Tpwl with respect to an increase of the engine cooling water temperature Twt occurs, the opening period control is performed in the knocking region S1 in accordance with the results of which of the intake gas temperature Tig and the estimated intake port wall temperature Tpwl is higher.

2-3. Processing of ECU concerning Opening Period Control of Intake Valve According to Second Embodiment FIG. 10 is a flow chart that illustrates a routine of the processing concerning the opening period control of the intake valve according to the second embodiment of the present disclosure. The processing of steps S100 to 110 in the routine shown in FIG. 10 is as already described in the first embodiment.

Figure 10:
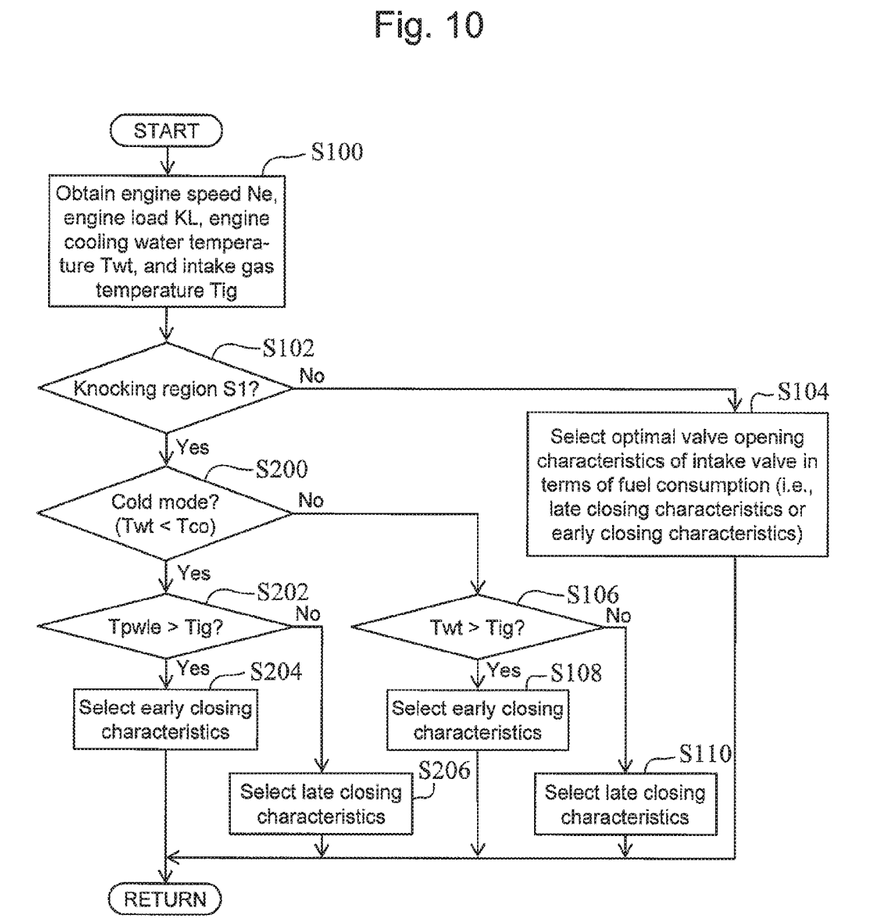
FIG. 10 is a flow chart that illustrates a routine of the processing concerning an opening period control of the intake valve according to a second embodiment of the present disclosure.

In the routine shown in FIG. 10, if the ECU 40 determines in step S102 that the current engine operating point is in the knocking region S1, processing proceeds to step S200. In step S200, it is determined whether or not the operating mode of the internal combustion engine 10 is in the cold mode (i.e., in the course of the engine warm-up). This determination can be, for example, performed on the basis of whether or not the engine cooling water temperature Twt is lower than a cold determination threshold value Tco.

If the determination result of step S200 is negative (Twt≥Tco), that is, if it can be judged that the operating mode is not in the cold mode (i.e., in the course of the engine warm-up), the ECU 40 executes the processing of steps S106 to S110.

If, on the other hand, the determination result of step S200 is positive (Twt<Tco), that is, if it can be judged that the operating mode is in the cold mode (i.e., in the course of the engine warm-up), the ECU 40 proceeds to step S202. In step S202, it is determined whether or not the estimated intake port wall temperature Tpwle (the current value Tpwle (i)) calculated in the procedure shown in FIG. 9 is higher than the intake gas temperature Tig.

If the ECU 40 determines in step S202 that the estimated intake port wall temperature Tpwle is higher than the intake gas temperature Tig, that is, if the low intake gas temperature condition (Tig<Tpwl) shown in FIG. 6 described above is met, the ECU 40 controls the variable valve operating device 26 such that the early closing characteristics in which the effective opening period OPe is relatively shorter is selected as with the processing of step S108 (step S204).

On the other hand, the results of determining in step S202 that the estimated intake port wall temperature Tpwle is equal to or lower than the intake gas temperature Tig includes a result of the high intake gas temperature condition (Tig>Tpwl) shown in FIG. 5 described above being met. If the high intake gas temperature condition (Tig>Tpwl) is met, the ECU 40 controls the variable valve operating device 26 such that the late closing characteristics in which the effective opening period OPe is relatively longer is selected (step S206).

2-4. Advantageous Effects of Opening Period Control of Intake Valve According to Second Embodiment According to the routine shown in FIG. 10 described so far, during execution of the cold mode (i.e., in the course of the engine warm-up), the estimated intake port wall temperature Tpwle is calculated from the engine cooling water temperature Twt while taking into consideration the response delay of the wall temperature Tpwl with respect to an increase of the engine cooling water temperature Twt, contrary to the first embodiment. Thus, in the course of the engine warm-up, the estimated intake port wall temperature Tpwle can be estimated more precisely than that according to the first embodiment while using the water temperature sensor 34 with which the internal combustion engine 10 is already equipped. Therefore, if the knocking region S1 is used in the course of the engine warm-up, the valve opening characteristics (the late closing characteristics or the early closing characteristics) of the intake valve that is appropriate in terms of a decrease of the compression end gas temperature (that is, suppression of knocking) can be selected more precisely at the individual time points in the course of the engine warm-up.

Other Embodiments

Additionally, in the first and second embodiments described above, in order to change the effective opening period OPe on the basis of which of the intake gas temperature Tig and the wall temperature Tpwl, the method of changing the closing timing IVC of the intake valve while fixing the opening timing IVO thereof by the use of the variable valve operating device 26 has been taken as an example. However, the opening period control of the intake valve that is addressed to the present disclosure may adjust the opening timing IVO instead of the closing timing IVC or in addition thereto, as far as the effective opening period OPe is controlled. It should be noted that, as already described, it is required, when the effective opening period OPe is controlled by the use of adjustment of the opening timing IVO, to provide a difference with respect to the opening timing IVO in the crank angle period at or after the intake top dead center. Moreover, the opening period control of the intake valve according to the present disclosure may not be always achieved by the use of the variable valve operating device 26 configured as described above, and may also be achieved by the use of a variable valve operating device that has an arbitrary configuration, such as a variable valve operating device that is capable of continuously changing the closing timing.

Furthermore, in the first and second embodiments described above, as an internal combustion engine to which the opening period control of the intake valve according to the present disclosure is applied, the internal combustion engine 10 that is a naturally aspirated engine has been taken as an example. However, the internal combustion engine that is addressed to the present disclosure may also be, for example, a supercharged engine, such as an internal combustion engine 50 described below with reference to FIG. 11.

Figure 11:
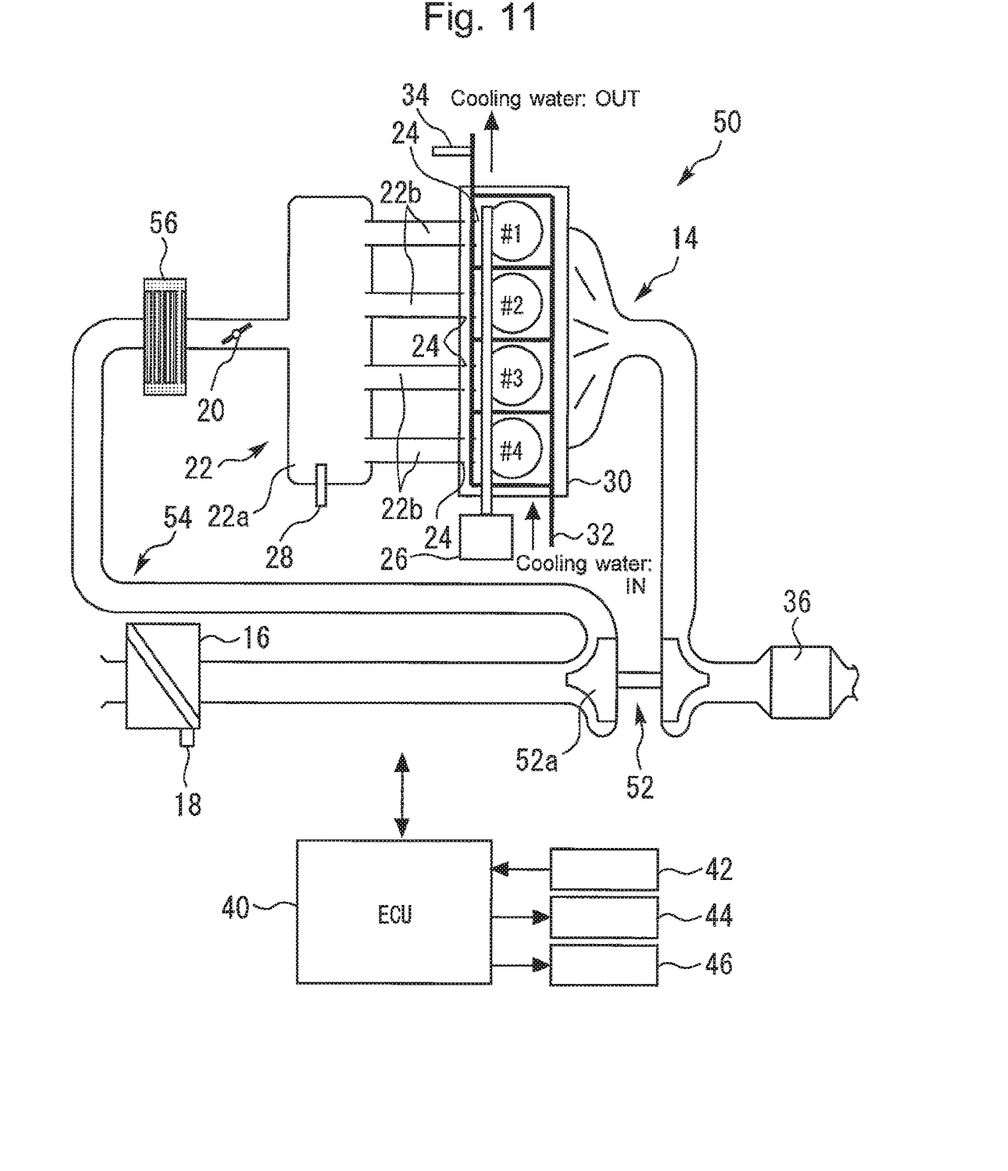
FIG. 11 is a diagram that illustrates an example of a system configuration of a supercharged engine.

FIG. 11 is a diagram that illustrates an example of a system configuration of a supercharged engine. In addition, in FIG. 11, elements that are the same as constituent elements illustrated in FIG. 1 described above are denoted by the same reference symbols, and a description of those elements is omitted or simplified hereunder.

The internal combustion engine 50 shown in FIG. 11 is provided with a turbo-supercharger 52 as an example of the supercharger. A compressor 52*a* of the turbo-supercharger 52 is arranged in an intake channel 54 on the upstream side of the throttle valve 20. Moreover, between the compressor 52*a* and the throttle valve 20, an intercooler 56 for cooling the intake gas compressed by the compressor 52*a* is installed.

In the configuration shown in FIG. 11, the intake gas temperature sensor 28 is located downstream of the intercooler 56. The intake gas temperature sensor 28 is used to grasp the intake gas temperature Tig in the intake port 24 and compare which of the intake gas temperature Tig and the wall temperature Tpwl is higher. Thus, broadly speaking, the location of the intake gas temperature sensor 28 in the intake channel 54 is not particularly limited. However, in order not to be affected by a change of the temperature of the intake gas that accompanies the cooling by the intercooler 56, it is favorable that the intake gas temperature sensor 28 is located on the downstream side of the intercooler 56 as in the example shown in FIG. 11.

What is claimed is:

1. A control device for an internal combustion engine, the internal combustion engine including a variable valve operating device that makes variable an opening period of an intake valve that opens and closes an intake port, wherein, where an opening period that is included in an actual opening period identified by an opening timing and a closing timing of the intake valve and which is located in a crank angle period from an intake top dead center to the closing timing is referred to as an effective opening period, the control device is configured, in an engine operating condition in which knocking is easy to occur, to increase the effective opening period when an intake gas temperature in the intake port is higher than a wall temperature of the intake port as compared to when the intake gas temperature is lower than the wail temperature.

2. The control device according to claim 1, wherein, in changing the effective opening period in the engine operating condition in which knocking is easy to occur, the control device is configured to change the closing timing without changing the opening timing.

3. The control device according to claim 1, wherein the internal combustion engine includes a water temperature sensor configured to detect an engine cooling water temperature of an engine cooling water that cools an engine main body, and wherein the control device is configured to estimate the wall temperature based on the engine cooling water temperature detected by the water temperature sensor.

4. The control device according to claim 3, wherein the control device is configured, in a course of an engine warm-up in which the engine cooling water temperature is lower than a certain value, to estimate the wall temperature based on the engine cooling water temperature in consideration of a response delay of the wall temperature with respect to an increase of the engine cooling water temperature.

\* \* \* \* \*